United States Patent
Nozu

(10) Patent No.: US 7,426,303 B2
(45) Date of Patent: Sep. 16, 2008

(54) IMAGE EXPANDING APPARATUS AND METHOD THEREOF

(75) Inventor: Takashi Nozu, Shizuoka (JP)

(73) Assignee: NEC Corporation, Tokyo (JP)

( * ) Notice: Subject to any disclaimer, the term of this patent is extended or adjusted under 35 U.S.C. 154(b) by 676 days.

(21) Appl. No.: 10/632,923

(22) Filed: Aug. 4, 2003

(65) Prior Publication Data
US 2004/0042672 A1 Mar. 4, 2004

(30) Foreign Application Priority Data
Aug. 30, 2002 (JP) .............................. 2002-254158

(51) Int. Cl.
G06K 9/36 (2006.01)
(52) U.S. Cl. ..................................... 382/232
(58) Field of Classification Search .................. 382/232
See application file for complete search history.

(56) References Cited

U.S. PATENT DOCUMENTS

| 6,714,202 | B2 * | 3/2004 | Dorrell ........................ 345/474 |
| 6,941,024 | B2 * | 9/2005 | Mukherjee ................... 382/248 |
| 6,968,086 | B1 * | 11/2005 | Fukuhara et al. ............. 382/233 |
| 7,120,297 | B2 * | 10/2006 | Simard et al. ................ 382/166 |
| 2002/0057843 | A1 * | 5/2002 | Matsubara ................... 382/240 |
| 2002/0057850 | A1 * | 5/2002 | Sirohey et al. ............... 382/299 |
| 2002/0091665 | A1 * | 7/2002 | Beek et al. ....................... 707/1 |
| 2004/0070122 | A1 | 4/2004 | Mizuno et al. |

FOREIGN PATENT DOCUMENTS

| JP | 08-070432 | 3/1996 |
| JP | 09-116759 | 5/1997 |
| JP | 2000-341689 | 12/2000 |
| JP | 2002-152517 | 5/2002 |
| JP | 2002-152744 | 5/2002 |

OTHER PUBLICATIONS

Information Technology, JPEG 2000 Image Coding System: Compound Image File Format (Nov. 2001), pp. 1-76, http://www.jpeg.org/public/fcd154444-1.pdf.
Information Technology, JPEG 2000 Image Coding System (Mar. 2000), pp. 1-190, http://www.jpeg.org/public/fcd15444-6.pdf.

* cited by examiner

Primary Examiner—Wenpeng Chen
(74) Attorney, Agent, or Firm—Foley & Lardner LLP

(57) ABSTRACT

An image expanding apparatus is disclosed, that comprises a coding parameter detecting portion for detecting coding parameters from an image code; an expanding parameter designating portion for designating expanding parameters; an extracting parameter calculating portion for calculating an extracting parameter based on the coding parameters and the expanding parameters; and a code extracting portion for extracting a code necessary for obtaining an expanded image designated by the expanding parameters from the image code with reference to the extracting parameter.

24 Claims, 6 Drawing Sheets

IMAGE EXPANDING APPARATUS AND METHOD THEREOF

BACKGROUND OF THE INVENTION

1. Field of the Invention

The present invention relates to an image expanding apparatus and a method thereof for restoring a compressed code of an image to an original image, in particular, to those according to the JPEG (Joint Photographic Experts Group) 2000 system.

2. Description of the Related Art

The JPEG system, which is a conventional image encoding system, uses DCT (Discrete Cosine Transform) and Huffman codes of zero run lengths and values of DCT coefficients as engineering elements. Due to characteristics of the encoding system, the codes cannot be directly changed. Thus, when some change is desired to be made for an image, it is necessary to expand the image, change the expanded image, and then re-encode the changed image. In contrast, the JPEG 2000 system, which is a new encoding system, uses a wavelet transform and a tile architecture that allow an image size and an image range to be easily changed.

The specification of the JPEG 2000 system is described in "JPEG 2000 Image Coding System", Information Technology, ISO/IEC JTC 1/SC29/WG 1, JPEG 2000 Part I Final Committee Draft Version 1.0, Mar. 16, 2000 (reference 1).

In the JPEG 2000 system, an image is divided into at least one tile. Each tile is transformed according to the discrete wavelet transform (DWT). Wavelet transform coefficients are arithmetically encoded for each bit map. In addition, the wavelet transform is performed for image at multiple stages. As shown in FIG. 1, an image is divided into an LL1 component, an LH1 component, an HL1 component, and an HH1 component. The LL1 component is sub-divided into an LL2 component, an LH2 component, an HL2 component, and an HH2 component. Each component is further sub-divided a plurality of times. In the example shown in FIG. 1, the LH1 component, the HL1 component, and the HH1 component compose a resolution level R3. The LH2 component, the HL2 component, and the HH2 component compose a resolution level R2. The resolution, the image size, and the number of gradation levels of the code of the JPEG 2000 system are scalable.

A code stream of the JPEG 2000 system is composed of one main header and a plurality of tile streams. Each tile stream is composed of one tile header and one packet stream. Each packet stream is composed of a plurality of packets. Each tile stream may be composed of a plurality of tile parts. In this case, the beginning tile part is composed of one tile header and a plurality of packets. Each of the second and later tile parts is composed of one tile part header and a plurality of packets.

The main header is composed of SOC (start of codestream), SIZ (image and tile size), COD (coding style default), QCD (quantization default), COC (coding style component), QCC (quantization component), RGN (region of interest), POC (progression order change), PPM (Packed packet header: main header), PLM (packet length: main header), TLM (tile-part lengths: main header), CRG (component registration), and COM (comment). However, only SOC, SIZ, COD, and QCD are mandatory. The others are optional. The tile header is composed of SOT (start of tile), COD (start of code), QCD (quantization default), COC (coding style component), QCC (quantization component), RGN (region of interest), POC (progression order change), PPT (packed packet headers: tile-part), PLT (packet length: tile-part), COM (comment), and SOD (start of data). However, only SOT and SOD are mandatory. The others are optional. The tile part header is composed of SOT (start of tile), POC (progression order change), PPT (packed packet headers: tile-part), PLT (packet length), COM (comment), and SOD (start of data). However, only SOT and OSD are mandatory. The others are optional.

The compound image file format of the JPEG 2000 system is described in "JPEG 2000 Image Coding System: Compound Image File Format", Information Technology, JPEG 2000 Part 6 FCD, ISO/IEC JTC 1/SC 29/WG1, Nov. 16, 2001 (reference 2). With a compound document file, individual portions of a page that contains text and an image can be compressed in different compressing systems.

According to the reference 2, a compound document file (JPM (JPEG 2000 File Format-Multi-layer) file) has a structure as shown in FIG. 2. One Page box (B.2.1) can contain any number of Layout Object boxes (B.3.1). One Layout Object box (B.3.1) may contain at least one Object box (B.4.1).

Japanese Patent Laid-Open Publication Nos. 2002-152517 (reference 3) and 2002-152744 (reference 4) disclose "Image expanding apparatus for transformed code" and "Image expanding method for transformed code".

However, according to the inventions disclosed as the foregoing references 3 and 4, a generated parameter of an original image cannot be obtained. Thus, an image cannot be optimally expanded. In addition, these inventions do not deal with a multiple layout object structure of an image. A layout object is defined as Object box (B.4.1) in the reference 2.

SUMMARY OF THE INVENTION

Therefore, an object of the present invention is to provide an image expanding apparatus and a method thereof that allow an expanded image of a designated range, a designated resolution, and a designated layout object to be obtained from a minimum amount of code.

According to the present invention, an image expanding apparatus is provided, that comprises a coding parameter detecting portion for detecting coding parameters from an image code; an expanding parameter designating portion for designating expanding parameters; an extracting parameter calculating portion for calculating an extracting parameter based on the coding parameters and the expanding parameters; and a code extracting portion for extracting a code necessary for obtaining an expanded image designated by the expanding parameters from the image code with reference to the extracting parameter.

The image expanding apparatus may further comprise an image expanding portion for obtaining an expanded image designated by the expanding parameters based on the extracted code.

In the image expanding apparatus, the code extracting portion may extract as the extracted code a code having a necessary resolution level of a necessary tile of a necessary layout object.

In the image expanding apparatus, the coding parameters include vertical and horizontal sizes in pixels of a page image, the number of layout objects in a page, and the size of a tile; the expanding parameters include an expanded image size proportional to the resolution of the expanded image, the number of layout objects to be displayed; the number of a layout object to be displayed, and an image display area for each layout object; the extracting parameter calculating portion is configured to calculate as the expanding parameters a layout object necessary for expanding an image, a tile necessary for each layout object, and a resolution level necessary for expanding an image based on the coding parameters and the expanding parameters.

In the image expanding apparatus, the image expanding apparatus deals with a compound document file format according to the JPEG 2000 system.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, an embodiment of the present invention will be described.

Figure 1:
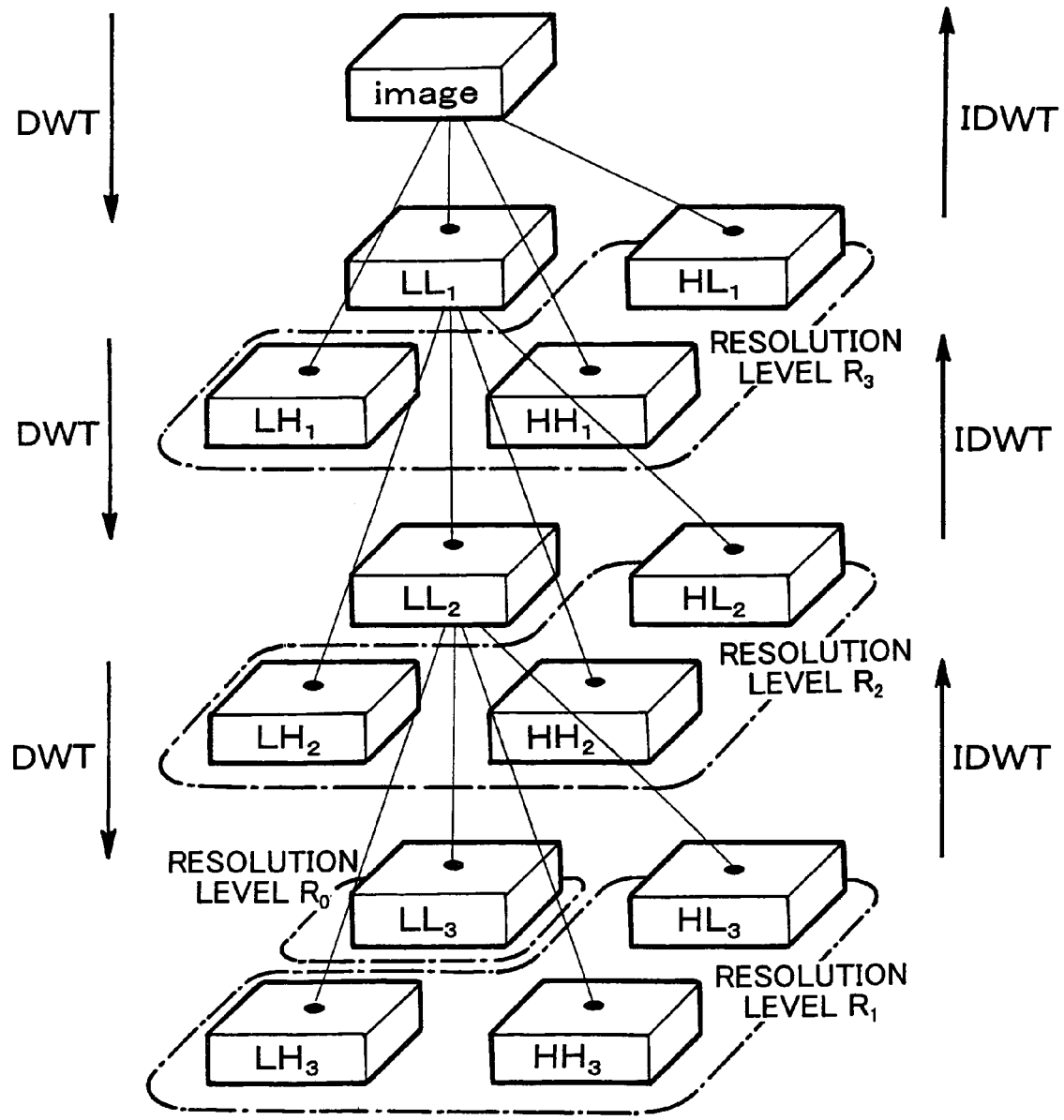
FIG. 1 is a schematic diagram describing a discrete wavelet transform according to the JPEG 2000 standard.
Figure 2:
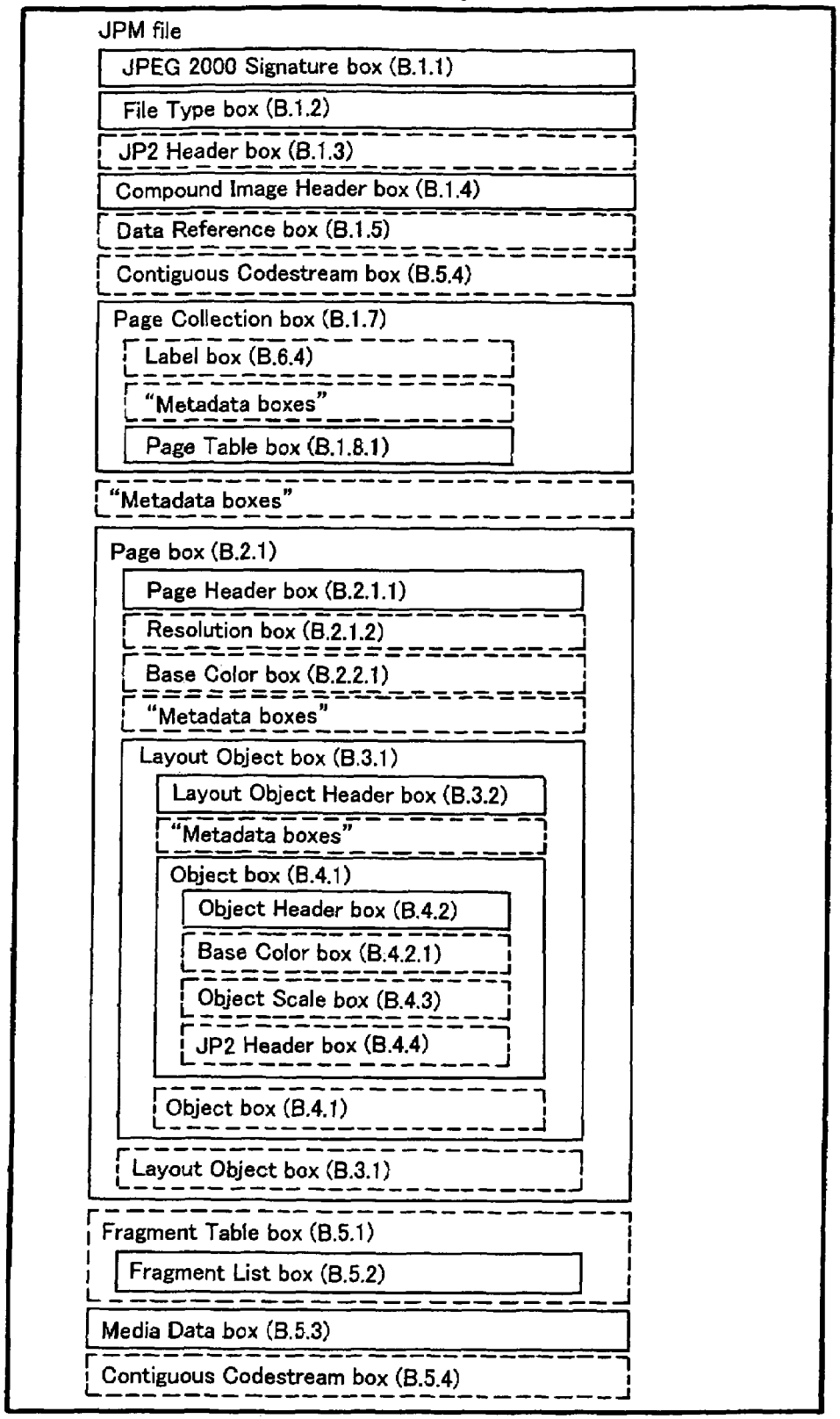
FIG. 2 is a schematic diagram showing the structure of a JPM file.
Figure 3:
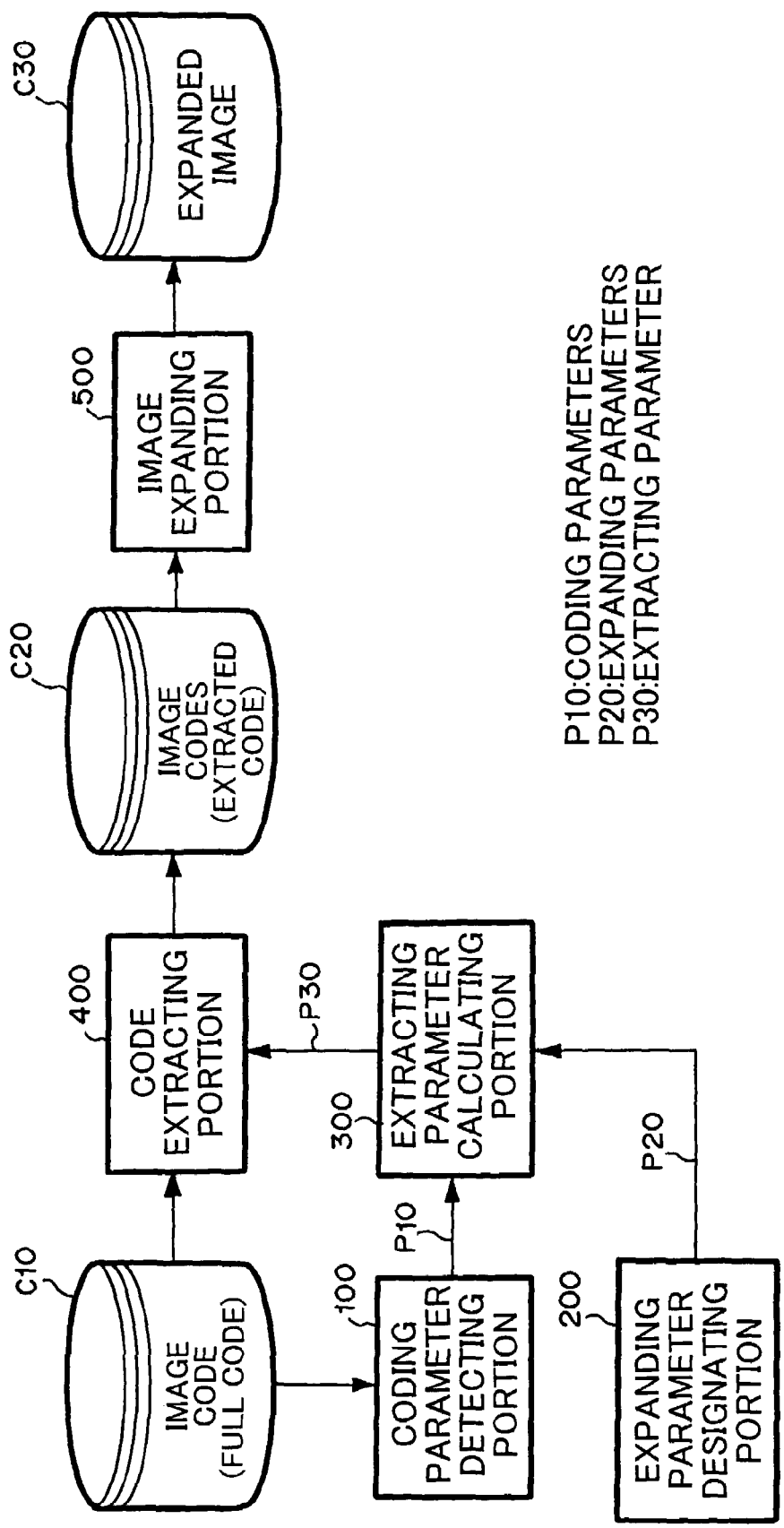
FIG. 3 is a block diagram showing the structure of image expanding apparatus according to an embodiment of the present invention.

FIG. 3 shows the structure of an image expanding apparatus according to an embodiment of the present invention. Referring to FIG. 3, the image expanding apparatus according to the present embodiment of the present invention has a coding parameter detecting portion 100, an expanding parameter designating portion 200, an extracting parameter calculating portion 300, a code extracting portion 400, and an image expanding portion 500.

The coding parameter detecting portion 100 detects coding parameters P10 from a JPM file. The coding parameters P10 contains vertical and horizontal sizes in pixels of a page image (Lheight (the height of a layout object) and Lwidth (the width of a layout object) of Layout Object Header box (B.3.2)), layout object information (Nlobj (the number of layout objects in a page) of Page Header box (B.2.1.1) (reference 2), and tile information (XTsiz (the height of a tile) and YTsiz (the width of a tile) of Siz of a code stream contained in Media Data box (B.5.3)).

Figure 4:
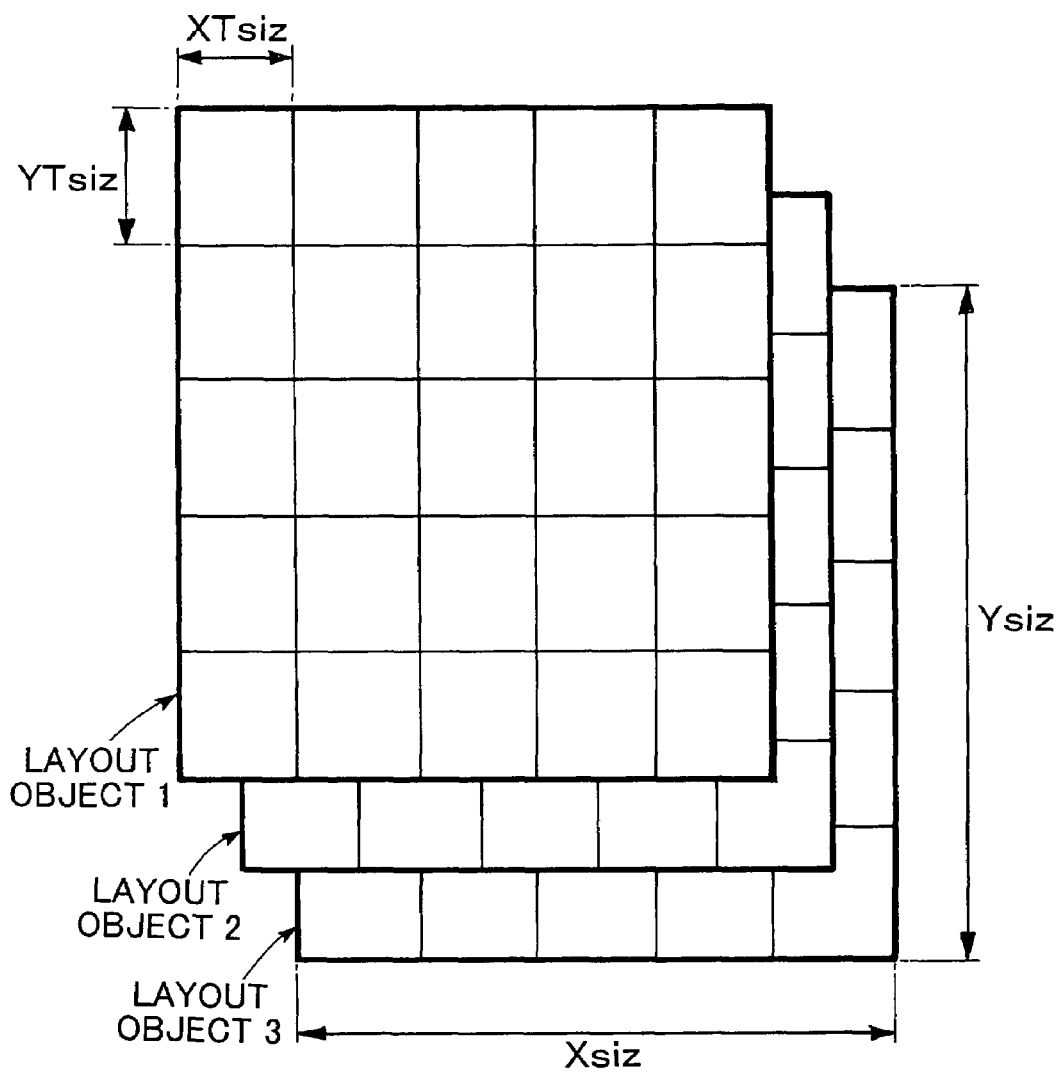
FIG. 4 is a schematic diagram showing a plurality of layout objects contained in a JPM file.

In an image code (full code) C10 shown in FIG. 4, (1) the vertical and horizontal sizes (in pixels) of an image are vertical Xsiz [pixels] and horizontal Ysiz [pixels], (2) the number of layout objects is 3, (3) the tile size (in pixels) of an image is vertical XTsiz [pixels] and horizontal YTsiz [pixels].

The expanding parameter designating portion 200 designates expanding parameters P20 such as an image display size and an image display layout object as an expanded result. The expanding parameters P20 contains the expanded image size (XIsiz [pixels]×YIsiz [pixels]) proportional to the resolution of an expanded image, the number of layout objects to be displayed [num_layer], the number of a layout object to be displayed (num_layers), and an image display area of each layout object (xs [pixels]×ys [pixels]).

Figure 5:
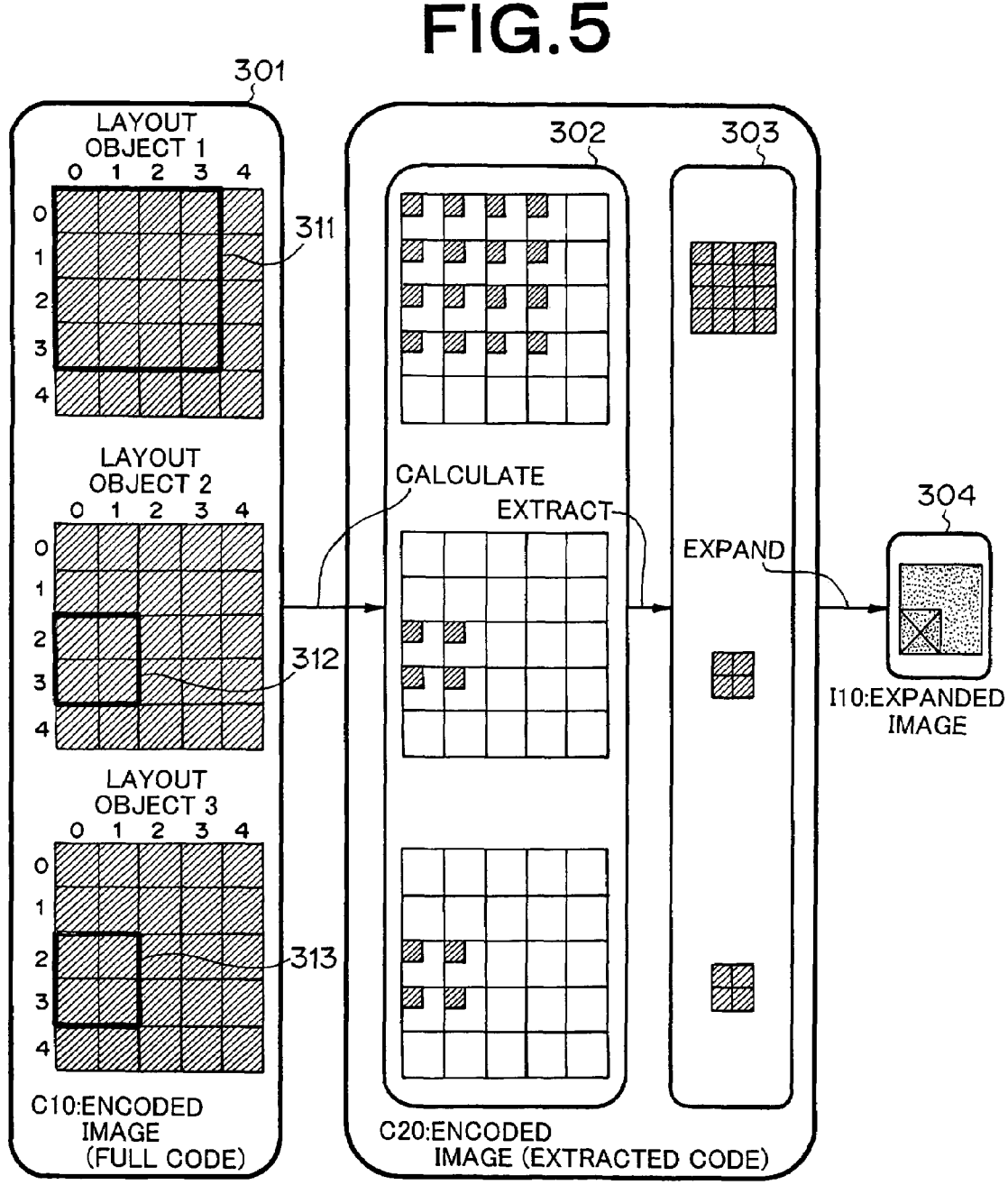
FIG. 5 is a schematic diagram showing a concept of a process for an image performed by the image expanding apparatus according to the embodiment of the present invention.

When an image represented by thick frames 311, 312, and 313 in a frame 301 on the left of FIG. 5 is restored to an expanded image I10 in a frame 304, (1) the vertical and horizontal sizes of the expanded image are designated as vertical XIsiz [pixels] and horizontal YIsiz [pixels], (2) the image display area is designated as a position represented by a thick frame, and (3) the number of layout objects is designated as 3. In this case, the vertical and horizontal sizes of the expanded image are given as follows:

$$XIsiz=2\times XTsiz,\ YIsiz=2\times YTsiz \qquad\text{Eq. 1}$$

The extracting parameter calculating portion 300 calculates an extracting parameter P30 using the coding parameters P10 detected by the coding parameter detecting portion 100 and the expanding parameters P20 designated by the expanding parameter designating portion 200. The extracting parameter P30 is used to optimally expand an encoded image. In other words, the extracting parameter calculating portion 300 calculates tiles of an image display area contained in the expanding parameters P20 for each layout object using the coding parameters P10 and the expanding parameters P20. In the example shown in FIG. 5, a layout object L1 is contained in a display area of tiles (0, 0) to (3, 3). Layout objects L2 and L3 are contained in display areas of tiles (0, 2) to (1, 3). In addition, the extracting parameter calculating portion 300 obtains a resolution level necessary for displaying an image with a resolution represented by the expanded image size contained in the enlarging parameter P20. To obtain the resolution level, the extracting parameter calculating portion 300 references the main header, the tile header, and the tile part header of the code stream.

In the example shown in FIG. 5, since the resolution level is the second highest resolution level, the code necessary for expanding the image is the LL1 component. In addition, the extracting parameter calculating portion 300 obtains a necessary layout object.

Thus, the extracting parameter P30 designates a layout object necessary for expanding an image, a tile necessary for each layout objects, and a resolution level necessary for expanding an image.

The code extracting portion 400 has a function for extracting an image code (extracted code) C20 to be expanded from the image code (full code) C10 corresponding to the extracting parameter P30. In other words, the code extracting portion 400 detects an offset address with respect to the beginning from OFF of Object Header box (B.4.2), a stream length from LEN thereof, and a reference box from DR thereof and whereby detects the beginning of the code stream. In addition, the code extracting portion 400 detects a tile number Isot of each SOT (start of tile) (A.4.2) (reference 1) contained in Contiguous Codestream box (B.5.4) (reference 2) of a code stream contained in Media Data box (B.5.3) (reference 2) of a JPM file, determines whether or not the detected tile number Isot accords with a necessary tile and a necessary resolution level designated by the extracting parameter P30, and extracts a tile that starts with SOT when the determined result is affirmed. The code extracting portion 400 performs this operation for the entire code stream.

To extract a necessary minimal amount of code for the resolution level, the code extracting portion 400 calculates the resolution level using Capture Resolution box (I.7.3.6.1) (reference 1) of Resolution box (I.7.3.6) (reference 1) of jp2 Header Box (I.7.3) (reference 1). According to the present invention, RLCP (Resolution level-layer-component-position) progression order is supposed.

The image expanding portion 500 generates an expanded image I10 (FIGS. 3 and 5) corresponding to a tile extracted by the code extracting portion 400. Since the image expanding portion 500 has the same structure as prior art, the detailed description will be omitted. The image expanding portion 500 performs an expanding method according to the reference 2. In particular, the image expanding portion 500 expands a plurality of layout objects according to the reference 2 and performs processes for a foreground, a background, and a mask using flags.

Figure 6:
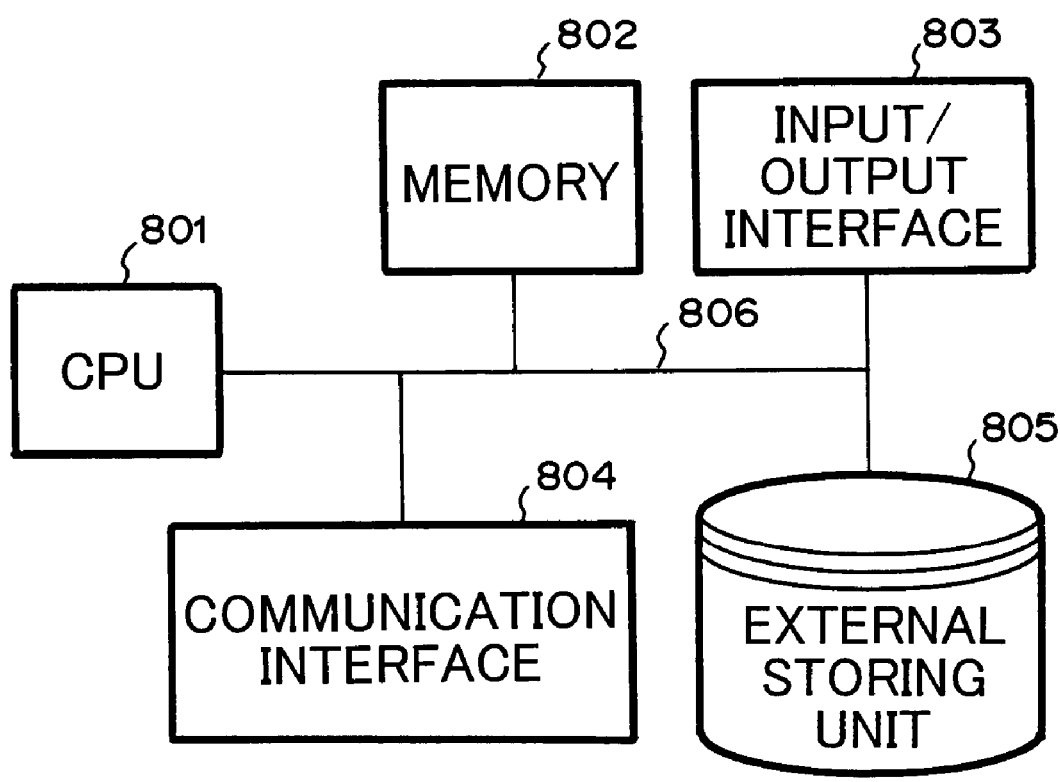
FIG. 6 is a schematic diagram showing a computer that accomplishes an image expanding apparatus according to an embodiment of the present invention.

The coding parameter detecting portion 100, the expanding parameter designating portion 200, the extracting parameter calculating portion 300, the code extracting portion 400, and the image expanding portion 500 can be accomplished by a computer that has a CPU 801, memory 802, an input/output interface 803, a communication interface 804, an external storing device 805, and a bus 805, which connect them, as shown in FIG. 6 and that reads and executes a program that causes the computer to perform those portions.

In addition, a method performed by the coding parameter detecting portion 100, the expanding parameter designating portion 200, the extracting parameter calculating portion 300, the code extracting portion 400, and the image expanding portion 500 can be accomplished by a computer that has a CPU 801, memory 802, an input/output interface 803, a communication interface 804, an external storing device 805, and a bus 805, which connect them, as shown in FIG. 6 and that reads and executes a program that causes the computer to perform those portions.

As described above, according to the present invention, since an optimum code is extracted corresponding to the size of an image to be expanded, as effects of the present invention, (1) the amount of code to be processed can be decreased, (2) the use of the memory can be decreased, (3) the expanding process can be quickly performed, and (4) the reliability can be improved. Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. An image expanding apparatus, comprising:
    coding parameter detecting means for detecting coding parameters from an image code, said image code including a plurality of layout objects, each layout object of said plurality of layout objects including a plurality of tiles, said coding parameters including a number of layout objects of the plurality of layout objects that are in a particular page;
    expanding parameter designating means for designating expanding parameters, said expanding parameters including a number of particular layout objects to be displayed in an expanded image;
    extracting parameter calculating means for calculating extracting parameters based on the coding parameters and the expanding parameters, said extracting parameters including (i) one or more certain layout objects of the plurality of layout objects that are necessary for providing the expanded image and (ii) for each layout object of the one or more certain layout objects, one or more particular tiles of the plurality of tiles of the layout object that are to be used to provide the expanded image; and
    code extracting means for extracting a code necessary for obtaining the expanded image designated by the expanding parameters from the image code with reference to the extracting parameters;
    wherein the coding parameters further include vertical and horizontal sizes in pixels of a page image and a size of a tile,
    wherein the expanding parameters further include an expanded image size proportional to a resolution of the expanded image and an image display area for each of the particular layout objects, and
    wherein the extracting parameter calculating means is configured to further calculate as the extracting parameters a resolution level necessary for expanding an image based on the coding parameters and the expanding parameters.

2. The image expanding apparatus as set forth in claim 1, further comprising:
    image expanding means for obtaining the expanded image designated by the expanding parameters based on the extracted code.

3. The image expanding apparatus as set forth in claim 1, wherein the code extracting means is configured to extract as the extracted code a code having a necessary resolution level of a necessary tile of a necessary layout object.

4. The image expanding apparatus as set forth in claim 1, wherein the image expanding apparatus deals with a compound document file format according to the JPEG 2000 system.

5. The image expanding apparatus as set forth in claim 1, wherein the code necessary for obtaining the expanded image is related to a resolution level obtained by the extracting parameter calculating means.

6. The image expanding apparatus as set forth in claim 1, wherein the extracting parameter is calculated for each display based on a coding parameter and an expanding parameter,
    wherein the coding parameter is static for each display and the expanding parameter is dynamic for each display.

7. The image expanding apparatus as set forth in claim 1, wherein the coding parameter, the expanding parameter and the extracting parameter are numbers instead of image codes.

8. The image expanding apparatus as set forth in claim 1, wherein the extracting parameter is calculated based upon a resolution level which is included in the coding parameters.

9. An image expanding method, comprising:
    detecting coding parameters from an image code, said image code including a plurality of layout objects, each layout object of said plurality of layout objects including a plurality of tiles, said coding parameters including a number of layout objects of the plurality of layout objects that are in a particular page;
    designating expanding parameters, said expanding parameters including a number of particular layout objects to be displayed in an expanded image;
    calculating extracting parameters based on the coding parameters and the expanding parameters, said extracting parameters including (i) one or more certain layout objects of the plurality of layout objects that are necessary for providing the expanded image and (ii) for each layout object of the one or more certain layout objects, one or more particular tiles of the plurality of tiles of the layout object that are to be used to provide the expanded image; and
    extracting a code necessary for obtaining the expanded image designated by the expanding parameters from the image code with reference to the extracting parameters;
    wherein the coding parameters further include vertical and horizontal sizes in pixels of a page image and a size of a tile, wherein the expanding parameters further include an expanded image size proportional to a resolution of the expanded image and an image display area for each of the particular layout objects, and wherein the extracting parameter calculating step further includes calculating as the extracting parameters a resolution level necessary for expanding an image based on the coding parameters and the expanding parameters.

10. The image expanding method as set forth in claim 9, further comprising:

obtaining the expanded image designated by the expanding parameters based on the extracted code.

11. The image expanding method as set forth in claim 9, wherein the code extracting step is performed by extracting as the extracted code a code having a necessary resolution level of a necessary tile of a necessary layout object.

12. The image expanding method as set forth in claim 9, wherein the image expanding method deals with a compound document file format according to the JPEG 2000 system.

13. The image expanding method as set forth in claim 9, wherein the code necessary for obtaining the expanded image is related to a resolution level obtained by calculating the extracting parameters.

14. The image expanding method as set forth in claim 9, wherein the extracting parameter is calculated for each display based on a coding parameter and an expanding parameter, wherein the coding parameter is static for each display and the expanding parameter is dynamic for each display.

15. The image expanding method as set forth in claim 9, wherein the coding parameter, the expanding parameter and the extracting parameter are numbers instead of image codes.

16. The image expanding method as set forth in claim 9, wherein the extracting parameter is calculated based upon a resolution level which is included in the coding parameters.

17. A storing device storing a program which, when executed on a computer, causes the computer to perform an image expanding method, the image expanding method comprising:

detecting coding parameters from an image code, said image code including a plurality of layout objects, each layout object of said plurality of layout objects including a plurality of tiles, said coding parameters including a number of layout objects of the plurality of layout objects that are in a particular page;

designating expanding parameters, said expanding parameters including a number of particular layout objects to be displayed in an expanded image;

calculating extracting parameters based on the coding parameters and the expanding parameters, said extracting parameters including (i) one or more certain layout objects of the plurality of layout objects that are necessary for providing the expanded image and (ii) for each layout object of the one or more certain layout objects, one or more particular tiles of the plurality of tiles of the layout object that are to be used to provide the expanded image; and extracting a code necessary for obtaining the expanded image designated by the expanding parameters from the image code with reference to the extracting parameters;

wherein the coding parameters further include vertical and horizontal sizes in pixels of a page image and a size of a tile, wherein the expanding parameters further include an expanded image size proportional to a resolution of the expanded image and an image display area for each of the particular layout objects, and wherein the extracting parameter calculating step further includes calculating as the extracting parameters a resolution level necessary for expanding an image based on the coding parameters and the expanding parameters.

18. The storing device as set forth in claim 17, wherein the image expanding method further comprises:

obtaining the expanded image designated by the expanding parameters based on the extracted code.

19. The storing device as set forth in claim 17, wherein the code extracting step is performed by extracting as the extracted code a code having a necessary resolution level of a necessary tile of a necessary layout object.

20. The storing device as set forth in claim 17, wherein the image expanding method deals with a compound document file format according to the JPEG 2000 system.

21. The storing device as set forth in claim 17, wherein the code necessary for obtaining the expanded image is related to a resolution level obtained by the extracting parameter calculating means.

22. The storing device as set forth in claim 17, wherein the extracting parameter is calculated for each display based on a coding parameter and an expanding parameter, wherein the coding parameter is static for each display and the expanding parameter is dynamic for each display.

23. The storing device as set forth in claim 17, wherein the coding parameter, the expanding parameter and the extracting parameter are numbers instead of image codes.

24. The storing device as set forth in claim 17, wherein the extracting parameter is calculated based upon a resolution level which is included in the coding parameters.

* * * * *